UNITED STATES PATENT OFFICE.

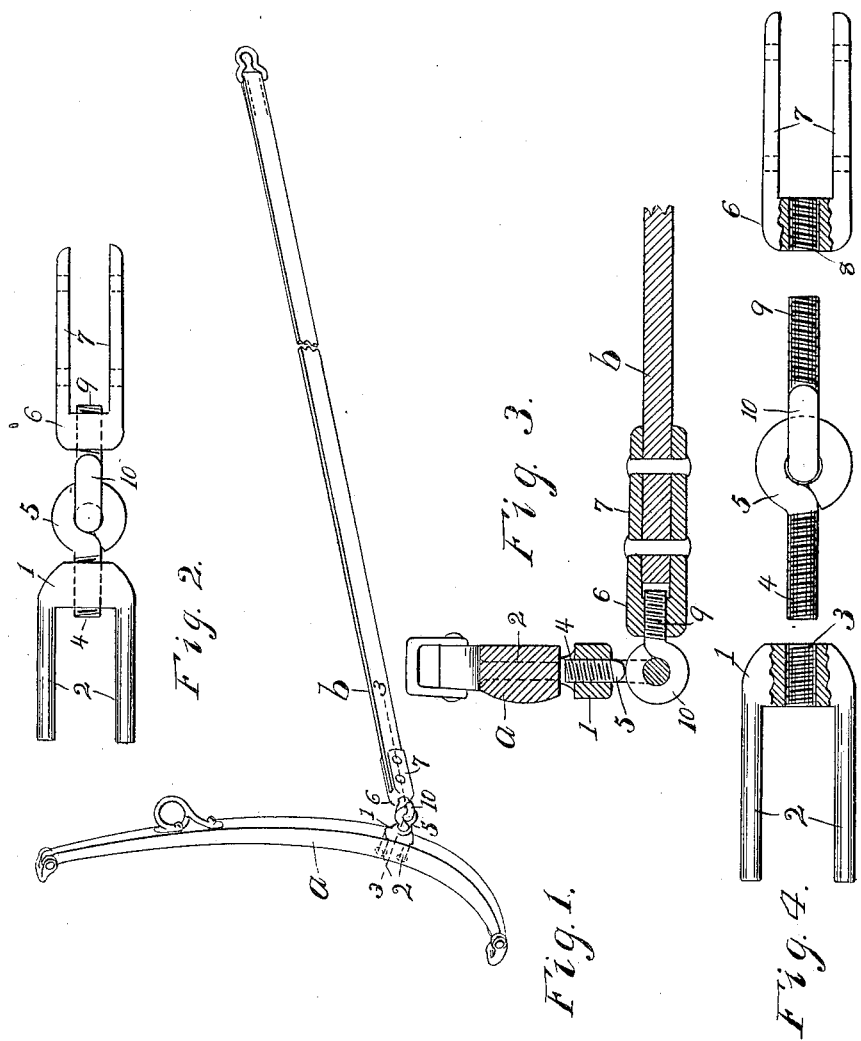

CHARLES H. HUDSON, OF OCONTO, NEBRASKA.

HAME AND TUG COUPLING.

1,088,992. Specification of Letters Patent. Patented Mar. 3, 1914.

Application filed July 30, 1913. Serial No. 781,905.

*To all whom it may concern:*

Be it known that I, CHARLES H. HUDSON, a citizen of the United States, residing at Oconto, in the county of Custer, State of Nebraska, have invented certain new and useful Improvements in Hame and Tug Couplings; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in hame and tug couplings, and has for its object to provide simple and effective means for attaching the ends of the tugs to the hame of a harness in such manner as to afford a firm but flexible union of the parts, and to enable quick repair of the connecting parts when they shall have become worn and require replacement, the above object being attained by the employment of the construction illustrated in the accompanying drawings, in which:

Figure 1 is a perspective view of a hame and tug showing my invention applied thereto. Fig. 2 is an elevation of the parts coupled. Fig. 3 is a horizontal section through Fig. 1 on dotted line 3—3. Fig. 4 is an elevation partly in section of the parts or the coupling detached.

Referring to the drawings by the characters of reference marked thereon, *a* represents one side of an ordinary hame and *b* represents the tug of an ordinary heavy draft harness.

1 represents a yoke or staple having stems 2 projecting from the body thereof which are adapted to extend through the hame and are riveted over at their inner ends as a means of securing the staple to the body of the hame, as shown by dotted lines in Figs. 1 and 3. Formed through the body of the staple 1 is a threaded aperture 3 adapted to receive the threaded stem 4 of the screw eye 5.

6 represents a yoke having flattened parallel sides adapted to embrace the tug *b* to which it is secured by riveting through the parts, as clearly shown in Figs. 1 and 3. The body of the yoke 7 is provided with a left hand threaded aperture 8 adapted to receive the left hand threaded stem 9 of the screw eye 10, said screw eye 10 being linked into the screw eye 5, thus forming a flexible or universally jointed coupling, whereby, when the threaded stems are entered in their corresponding apertures in the yokes 1 and 6, and the couplings rotated, the yokes will be drawn up upon the stems to the points of engagement with the eyes of the coupling, and when the parts are swung to a position at right-angles, as shown in Figs. 1 and 3, each screw eye will lock the other against rotation and withdrawal from its corresponding member.

It will be seen from the foregoing that with the body portions once secured to the hames and tugs, they will not be required to be disturbed or removed in effecting a repair or replacement of the screw eyes upon which the bulk of the wear and strain occurs. The worn-out eyes may be readily unscrewed from the body members and a new link or coupling inserted by screwing the parts in place as before described.

Having thus fully set forth my invention, what I claim as new, and desire to secure by Letters Patent, is:—

1. A hame and tug coupling comprising body members adapted for permanent attachment respectively to the hame and tug of a harness and having formed respectively therein right and left hand threaded apertures, and a universally jointed coupling having right and left hand threaded terminals adapted to engage respectively said threaded apertures.

2. A hame and tug coupling comprising a hame staple having projecting stems adapted to be riveted to the hame, and having a threaded aperture formed in the body thereof, a tug yoke having flattened parallel side members adapted to be riveted to the tug and having a left hand threaded aperture formed in the body thereof, and a two part coupling comprising a right hand threaded screw eye and a left handthreaded screw eye linked together and adapted to detachably engage respectively at their threaded ends the threaded apertures in said hame and tug members.

In testimony whereof, I sign this specification in the presence of two witnesses.

CHARLES H. HUDSON.

Witnesses:
W. D. EASTMAN,
MERLE G. CAMPAN.

Copies of this patent may be obtained for five cents each, by addressing the "Commissioner of Patents, Washington, D. C."